(12) United States Patent
Kita

(10) Patent No.: US 8,294,805 B2
(45) Date of Patent: Oct. 23, 2012

(54) IMAGE CAPTURING APPARATUS CAPABLE OF DISPLAYING LIVE PREVIEW IMAGE

(75) Inventor: Kazunori Kita, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 299 days.

(21) Appl. No.: 12/470,090

(22) Filed: May 21, 2009

(65) Prior Publication Data

US 2009/0290046 A1 Nov. 26, 2009

(30) Foreign Application Priority Data

May 23, 2008 (JP) ................ P2008-135413

(51) Int. Cl.
H04N 5/222 (2006.01)
H04N 5/76 (2006.01)
H04N 5/262 (2006.01)

(52) U.S. Cl. ......... 348/333.02; 348/333.01; 348/333.03; 348/333.04; 348/333.05; 348/231.99; 348/231.2; 348/240.99; 348/240.1; 348/240.2; 348/240.3

(58) Field of Classification Search ...... 348/207.99–376
See application file for complete search history.

(56) References Cited

U.S. PATENT DOCUMENTS

| | | | | |
|---|---|---|---|---|
| 4,942,417 | A * | 7/1990 | Miyazawa et al. | 396/50 |
| 5,631,697 | A * | 5/1997 | Nishimura et al. | 348/172 |
| 7,057,658 | B1 * | 6/2006 | Shioji et al. | 348/333.12 |
| 2008/0220821 | A1 * | 9/2008 | Okuzako et al. | 455/566 |

FOREIGN PATENT DOCUMENTS

| | | |
|---|---|---|
| JP | 5-91071 U | 12/1993 |
| JP | 6-332067 A | 12/1994 |
| JP | 8-321982 A | 12/1996 |
| JP | 10-155111 A | 6/1998 |
| JP | 2882391 B2 | 2/1999 |
| JP | 2000-321649 A | 11/2000 |
| JP | 3372989 B2 | 11/2002 |
| JP | 2004-343363 A | 12/2004 |
| JP | 2004343363 A * | 12/2004 |

(Continued)

OTHER PUBLICATIONS

Japanese Office Action dated Apr. 20, 2010 and English translation thereof in counterpart Japanese Application No. 2008-135413.

(Continued)

*Primary Examiner* — Nhan T Tran
*Assistant Examiner* — Yih-Sien Kao
(74) *Attorney, Agent, or Firm* — Holtz, Holtz, Goodman & Chick, PC

(57) ABSTRACT

An image capturing apparatus includes: an imaging unit configured to capture an image of a subject and outputs image data containing the image; a display unit configured to display a live preview image of the subject based on the image data output from the imaging unit; a processor configured to set an image size of the image to be recorded and perform image processing on the live preview image to control a display range of the live preview image to be displayed on the display unit based on the image size to be recorded.

13 Claims, 14 Drawing Sheets

FOREIGN PATENT DOCUMENTS

| | | | |
|---|---|---|---|
| JP | 2005-354577 A | | 12/2005 |
| JP | 2006-019882 A | | 1/2006 |
| JP | 2008-042847 A | | 2/2008 |
| JP | 2008-096582 A | | 4/2008 |
| JP | 2008096582 A | * | 4/2008 |

OTHER PUBLICATIONS

Japanese Office Action dated Mar. 22, 2011 (and English translation thereof) in counterpart Japanese Application No. 2008-135413.
Japanese Office Action dated Jun. 26, 2012 and English translation thereof in counterpart Japanese Application No. 2011-136851.

* cited by examiner

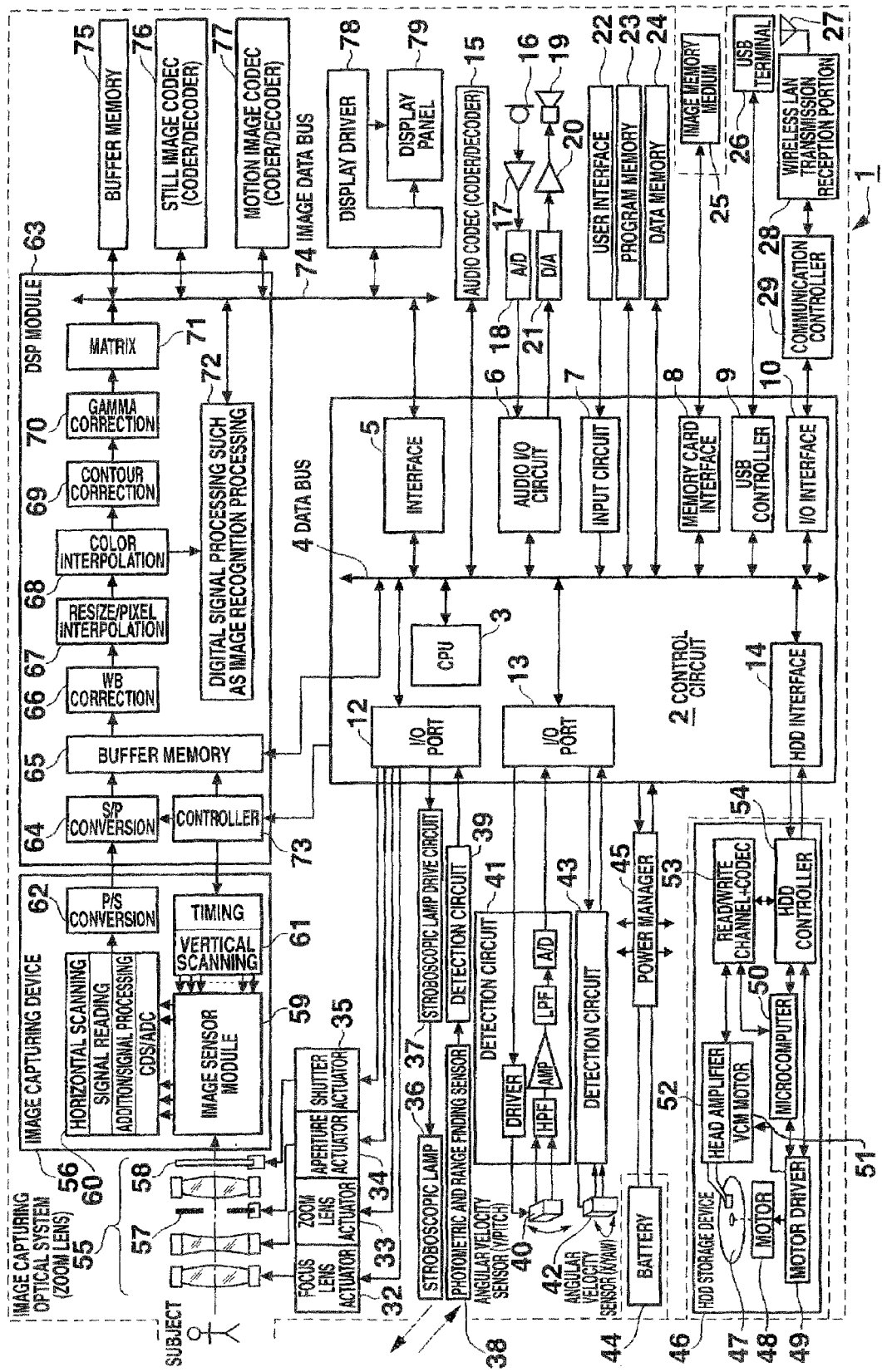

FIG.7

| | VISUAL FIELD WIDENING RATIO WR=200% | (0.5) | (0.63) | (0.75) | 1 | 1.5 | 2 | 2.5 | | 2.82 - 5.625 |
|---|---|---|---|---|---|---|---|---|---|---|
| TOTAL ZOOM MAGNIFYING POWER (Z) Z=OpZ×DZ÷(WR/100) | WR=150% | (0.67) | (0.83) | 1 | 1.33 | 2 | 2.67 | 3.33 | - | 5 - 10 |
| | WR=125% | (0.8) | 1 | 1.2 | 1.6 | 2.4 | 3.2 | 4 | 4 - 4.8 | 7.2 - 14.4 |
| | WR=100% | 1 | 1.25 | 1.5 | 2 | 3 | 4 | 5 | 5 - 7.5 | 11.25 - 22.5 |
| OPTICAL ZOOM MAGNIFYING POWER (OpZ) | OpZ | 1× | 1.25× | 1.5× | 2× | 3× | 4× | 5× | 5× AS IT IS | |
| | FOCUS LENGTH f [mm] | 5 | 6.25 | 7.5 | 10 | 15 | 20 | 25 | 25mm | |
| DIGITAL ZOOM MAGNIFYING POWER (DZ) | WR=200% | | WITHOUT DIGITAL ZOOM (DZ=1) | | | | | | - | 1.125 - 2.25 |
| | WR=150% | | WITHOUT DIGITAL ZOOM (DZ=1) | | | | | | - | 1.5 - 3 |
| | WR=125% | | WITHOUT DIGITAL ZOOM (DZ=1) | | | | | | 1 - 1.2 | 1.8 - 3.6 |
| | WR=100% | | WITHOUT DIGITAL ZOOM (DZ=1) | | | | | | 1 - 1.5 | 2.25 - 4.5 |
| READING MODE | SELECTIVE READING | | WHOLE REGION READING | | | | | | SELECTIVE READ OF (1/DZ)×(1/DZ) REGION | |
| | ADDITIVE READING | | WITHOUT ADDITION (1×1) | | | | | | 3×3 ADDITIVE READING | 2×2 ADDITIVE READING | 1×1 WITHOUT ADDITION |

EXAMPLE: WHEN THE OPTICAL ZOOM IS (×1 TO ×5), THE CAPTURED FULL IMAGE SIZE IS ($X_F$=2880, $Y_F$=2160), AND THE DISPLAY WRITE SIZE IS ($X_d$=640, $Y_d$=480) (OR THE RECORDING IMAGE SIZE IS ($X_R$=640, $Y_R$=480) FOR MOTION IMAGE CAPTURING)

FIG.9

| | VISUAL FIELD WIDENING RATIO WR=200% | | (0.5 - 0.56) | (0.56) - 1.125 | 1.125 | 2.25 | 3.375 | 4.5 | 5.625 |
|---|---|---|---|---|---|---|---|---|---|
| TOTAL ZOOM MAGNIFYING POWER (Z) | WR=150% | — | (0.66) - 1 | 1 - 2 | 2 | 4 | 6 | 8 | 10 |
| | WR=125% | (0.8 - 0.96) | (0.96) - 1.44 | 1.44 - 2.88 | 2.88 | 5.76 | 8.64 | 11.52 | 14.4 |
| | WR=100% | 1 - 1.5 | 1.5 - 2.25 | 2.25 - 4.5 | 4.5 | 9 | 13.5 | 18 | 22.5 |
| OPTICAL ZOOM MAGNIFYING POWER (OpZ) | OpZ | | 1× AS IT IS | | 1× | 2× | 3× | 4× | 5× |
| | FOCUS LENGTH f [mm] | | 5mm | | 5 | 10 | 15 | 20 | 25 |
| DIGITAL ZOOM MAGNIFYING POWER (DZ) | WR=200% | | | 1 - 1.125 | 1.125 - 2.25 | 2.25× AS IT IS | | | |
| | WR=150% | | | 1 - 1.5 | 1.5 - 3 | 3× AS IT IS | | | |
| | WR=125% | 1 - 1.2 | 1.2 - 1.8 | 1.8 - 3.6 | 3.6× AS IT IS | | | | |
| | WR=100% | 1 - 1.5 | 1.5 - 2.25 | 2.25 - 4.5 | 4.5× AS IT IS | | | | |
| READING MODE | SELECTIVE READING | SELECTIVE READ OF (1/DZ)×(1/DZ) REGION | | | SELECTIVE READ OF (1/DZ$_{max}$)×(1/DZ$_{max}$) REGION | | | | |
| | ADDITIVE READING | 3×3 ADDITIVE READING | 2×2 ADDITIVE READING | 1×1 WITHOUT ADDITION | WITHOUT ADDITION (1×1) | | | | |

EXAMPLE: WHEN THE OPTICAL ZOOM IS (×1 TO ×5), THE FULL IMAGE SIZE OF THE IMAGE CAPTURING DEVICE IS ($X_F$=2880, $Y_F$=2160), AND THE DISPLAY WRITE SIZE IS ($X_d$=640, $Y_d$=480) (OR THE RECORDING IMAGE SIZE IS ($X_R$=640, $Y_R$=480) FOR MOTION IMAGE CAPTURING)

IMAGE CAPTURING APPARATUS CAPABLE OF DISPLAYING LIVE PREVIEW IMAGE

CROSS-REFERENCE TO THE RELATED APPLICATION(S)

The present application is based upon and claims priority from prior Japanese Patent Application No. 2008-135413, filed on May 23, 2008, the entire content of which are incorporated herein by reference.

TECHNICAL FIELD

The present invention relates to an image capturing apparatus provided with a unit for displaying a subject, such as an electronic finder, and to a method and computer readable medium for controlling the image capturing apparatus.

BACKGROUND

Following configurations are known for a conventional image capturing apparatus.

A square image is captured and converted into square digital image data, the square digital image data is trimmed horizontally and vertically in accordance with a state of a horizontal/vertical switching unit to thereby extract a partial region from the square digital image data, and the partial region of the square digital image data is recorded on an image memory. An example of such configuration is disclosed in JP-B2-2882391.

A first point and a second point are designated on an image of a subject to thereby set a trimming position so that a trimming range is set based on either of vertical and horizontal dimensions and an aspect ratio between the first and second points. An example of such configuration is disclosed in JP-B2-3372989.

In the technique disclosed in the publication JP-B2-2882391, since a partial region extracted by trimming a square digital image data vertically or horizontally is recorded on an image memory, it is however impossible to confirm in advance whether an image region desired by a user is contained in the extracted partial region or not. For this reason, an image containing the image region desired by the user may be unable to be stored because there is a possibility that the desired image region may be not contained in the extracted region.

On the other hand, in the technique disclosed in the publication JP-B2-3372989, it is possible to contain an image region desired by a user in a trimming range or record an image range having a shape desired by a user. It is however complicated to perform the operation of setting a trimming position by designating first and second points on an image of a subject at the time of image capturing, so that it is difficult to set an image range containing the image region desired by the user.

SUMMARY

According to an aspect of the invention, there is provided an image capturing apparatus including: an imaging unit configured to capture an image of a subject and outputs image data containing the image; a display unit configured to display a live preview image of the subject based on the image data output from the imaging unit; a processor configured to set an image size of the image to be recorded and perform image processing on the live preview image to control a display range of the live preview image to be displayed on the display unit based on the image size to be recorded.

According to another aspect of the invention, there is provided a method for controlling an image capturing apparatus, wherein the apparatus includes: an imaging unit configured to capture an image of a subject and outputs image data containing the image; and a display unit configured to display a live preview image of the subject based on the image data output from the imaging unit, and wherein the method includes: setting an image size of the image to be recorded; and performing image processing on the live preview image to control a display range of the live preview image to be displayed on the display unit based on the image size to be recorded.

According to another aspect of the invention, there is provided a computer readable medium containing a sequence of instructions for a program executable by a computer system provided in an image capturing apparatus, wherein the apparatus includes: an imaging unit configured to capture an image of a subject and outputs image data containing the image; and a display unit configured to display a live preview image of the subject based on the image data output from the imaging unit, and wherein the program causes the computer system to perform a process comprising: setting an image size of the image to be recorded; and performing image processing on the live preview image to control a display range of the live preview image to be displayed on the display unit based on the image size to be recorded.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIG. 2 is a block diagram showing the circuit configuration of an image capturing apparatus according to the embodiment.

FIG. 7 is a table showing specific numerical values obtained by the optical and digital interlocking zoom processing (1).

FIG. 9 is a table showing specific numerical values obtained by the optical and digital interlocking zoom processing (2).

DETAILED DESCRIPTION

Figure 1A:
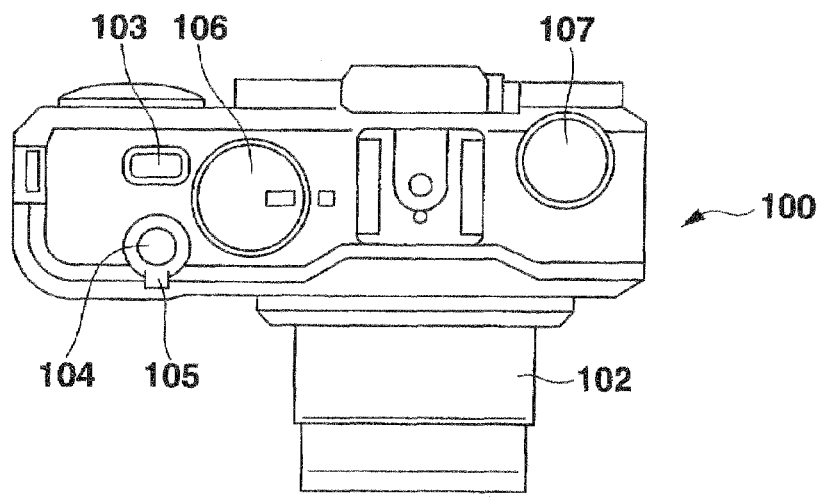
FIGS. 1A and 1B are a plan view and a rear view of a digital camera according to an embodiment of the invention.

Embodiments according to the present invention will be described in detail with reference to the accompanying drawings. The scope of the claimed invention should not be limited to the examples illustrated in the drawings and those described in below.

Figure 1B:
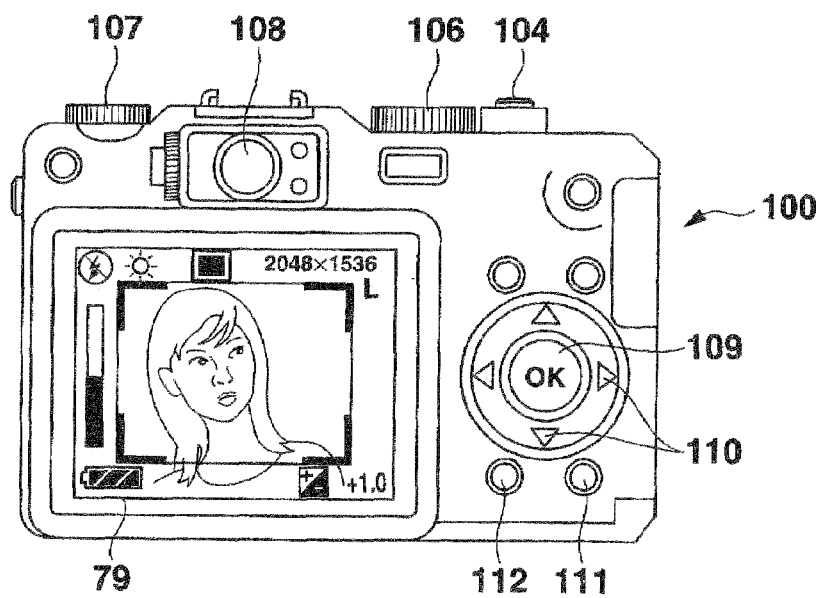

FIG. 1A is a plan view of a digital camera 100 according to an embodiment of the invention. FIG. 1B is a rear view of the digital camera 100. The digital camera 100 has a body 101. An image capturing lens 102 is provided in a front face of the body 101. A power switch 103, a shutter button (release button) 104, a zoom lever 105, an image capturing mode dial 106 and a multipurpose dial 107 are provided in an upper face of the body 101. An optical finder 108, an OK key 109, cursor keys 110, a DISPLAY key 111, a MENU key 112 and a display panel 79 are provided in a rear face of the body 101. Any one of modes shown in flow charts which will be described later is set by an operation of the mode dial 106. When the cursor keys 110 and the OK key 109 are operated in the condition where any one of the modes has been set, options in the set mode can be selected. The display panel 79 includes an LCD panel. The display panel 79 also serves as a monitor for reproducing and displaying recorded still images and motion images.

FIG. 2 is a block diagram showing a circuit configuration of the digital camera 100. The digital camera 100 has a high-speed rapid shooting function. As shown in FIG. 2, the digital camera 100 has a control circuit 2. The control circuit 2 has a processor (CPU) 3. The control circuit 2 further has an interface 5, an audio input/output circuit 6, an input circuit 7, a memory card interface 8, a USB controller 9, an input/output interface 10, input/output ports 12 and 13 and an HDD interface 14 which are connected to the CPU 3 through a data bus 4. A microphone 16 is connected to the audio input/output circuit 6 through an amplifier 17 and an A/D converter 18. A speaker 19 is further connected to the audio input/output circuit 6 through an amplifier 20 and a D/A converter 21. An user interface 22 provided with various operation keys, switches, etc. is connected to the input circuit 7. An image memory medium 25 provided detachably is connected to the memory card interface 8. The USB controller 9 is connected to a USB terminal 26. The input/output interface 10 is connected, through a communication controller 29, to a wireless LAN transmission/reception portion 28 having an antenna 27.

A focus lens actuator 32, a zoom lens actuator 33, an aperture actuator 34 and a shutter actuator 35 are connected to the input/output port 12. A stroboscopic lamp 36 is further connected to the input/output port 12 through a stroboscopic lamp drive circuit 37. A photometric and range finding sensor 38 is further connected to the input/output port 12 through a detection circuit 39. An angular velocity sensor (Y/Pitch) 40 for detecting vertical displacement (pitching) of the digital camera 100 and an angular velocity sensor (X/Yaw) 42 for detecting horizontal displacement (yawing) of the digital camera are connected to the input/output port 13 through detection circuits 41 and 43 respectively. An HDD storage device 46 is connected to the HDD interface 14. The HDD storage device 46 has a disk platter 47. The HDD storage device 46 further has a motor 48, a motor driver 49, a microcomputer 50, a VC motor 51, a head amplifier 52, a read/write channel+CODEC 53, and an HDD controller 54.

A battery 44 is connected to the control circuit 2 through a power manager 45. The power manager 45 is controlled by the control circuit 2 to feed electric power from the battery 44 to the components provided in the digital camera 1. Further, an audio CODEC (coder/decoder) 15, a program memory 23 and a data memory 24 are connected to the data bus 4. The audio CODEC 15 encodes an audio signal and decodes audio data. The program memory 23 stores a program for operating the control circuit 2 shown in the flow charts which will be described later. The data memory 24 stores various kinds of data in advance and data other than image data.

An image capturing device 56 is disposed on a rear optical axis of an image capturing optical system 55 including a zoom lens and a wide-angle lens. An aperture 57 actuated by the aperture actuator 34 and a shutter 58 actuated by the shutter actuator 35 are interposed in the image capturing optical system 55. The focus lens actuator 32 actuates a focus lens in the image capturing optical system 55. The zoom lens actuator 33 actuates the zoom lens.

The image capturing device 56 is capable of high-speed reading such as parallel reading. The image capturing device 56 has an image sensor module 59, a horizontal scanning module 60, a vertical scanning module 61, and a P/S conversion module 62. A DSP module 63 is connected to the image capturing device 56. The DSP module 63 has an S/P conversion module 64, a buffer memory 65, a WB correction module 66, a resize/pixel interpolation module 67, a color interpolation module 68, a contour correction module 69, a gamma correction module 70 and a matrix circuit 71 in order to process an image signal imported from the P/S conversion module 62 to the DSP module 63. The DSP module 63 further has a controller 73, the buffer memory 65 and a digital signal processor 72 for performing digital image processing such as image recognition processing in order to control the period of the vertical scanning module 61.

The matrix circuit 71 and the digital signal processor 72 for performing digital image processing such as image recognition processing are connected, through an image data bus 74, to a buffer memory 75, a still image CODEC (coder/decoder) 76, a motion image CODEC (coder/decoder) 77 and a display driver 78. The image data bus 74 is connected to the interface 5 of the control circuit 2. The digital signal processor 72 combines captured images by digital processing. The buffer memory 75 temporarily stores image data while the still image CODEC 76 and the motion image CODEC 77 perform coding and decoding. The display driver 78 controls the (finder) display panel 79.

Figure 3:
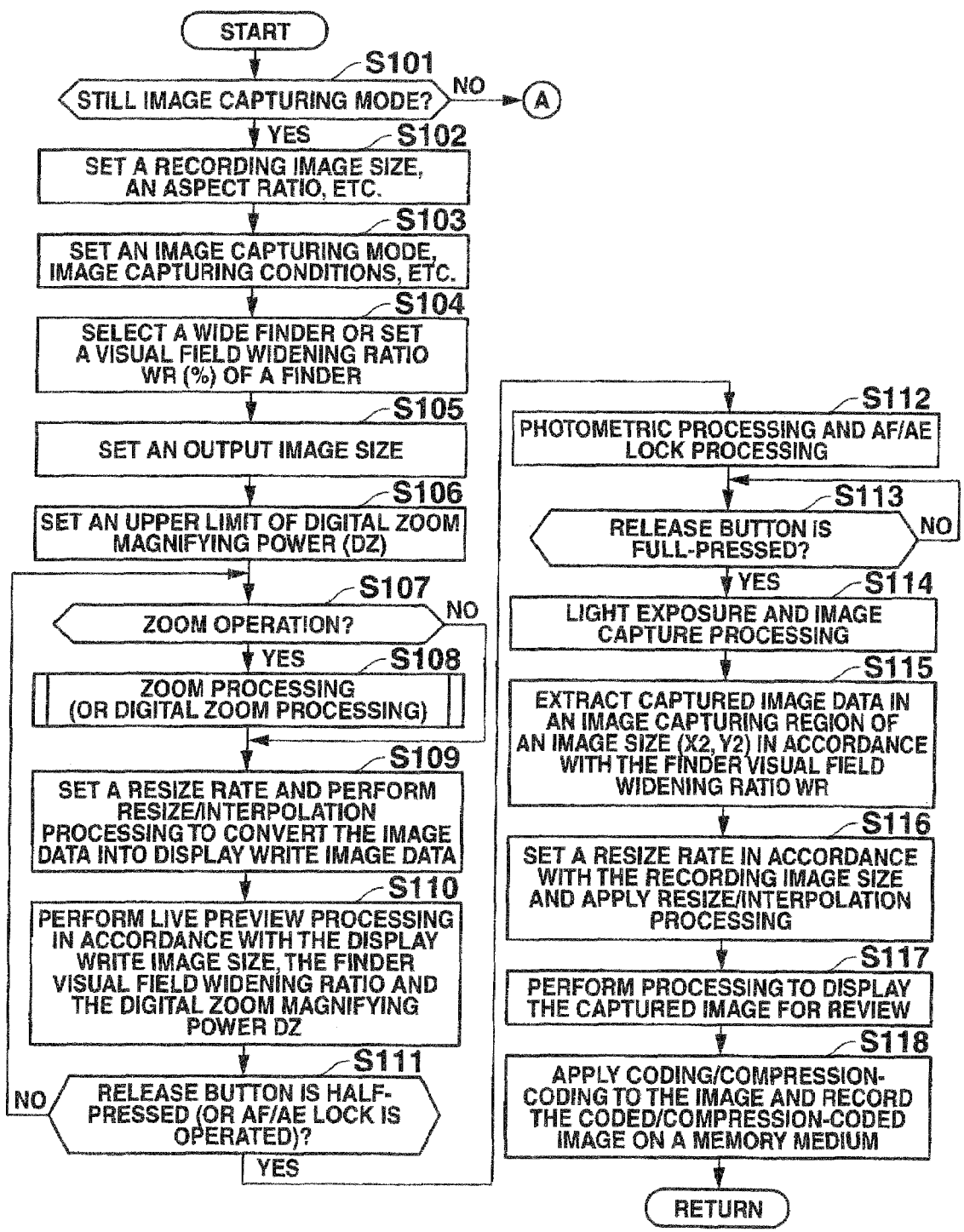
FIG. 3 is a flow chart showing an overall processing procedure in the embodiment.
Figure 4:
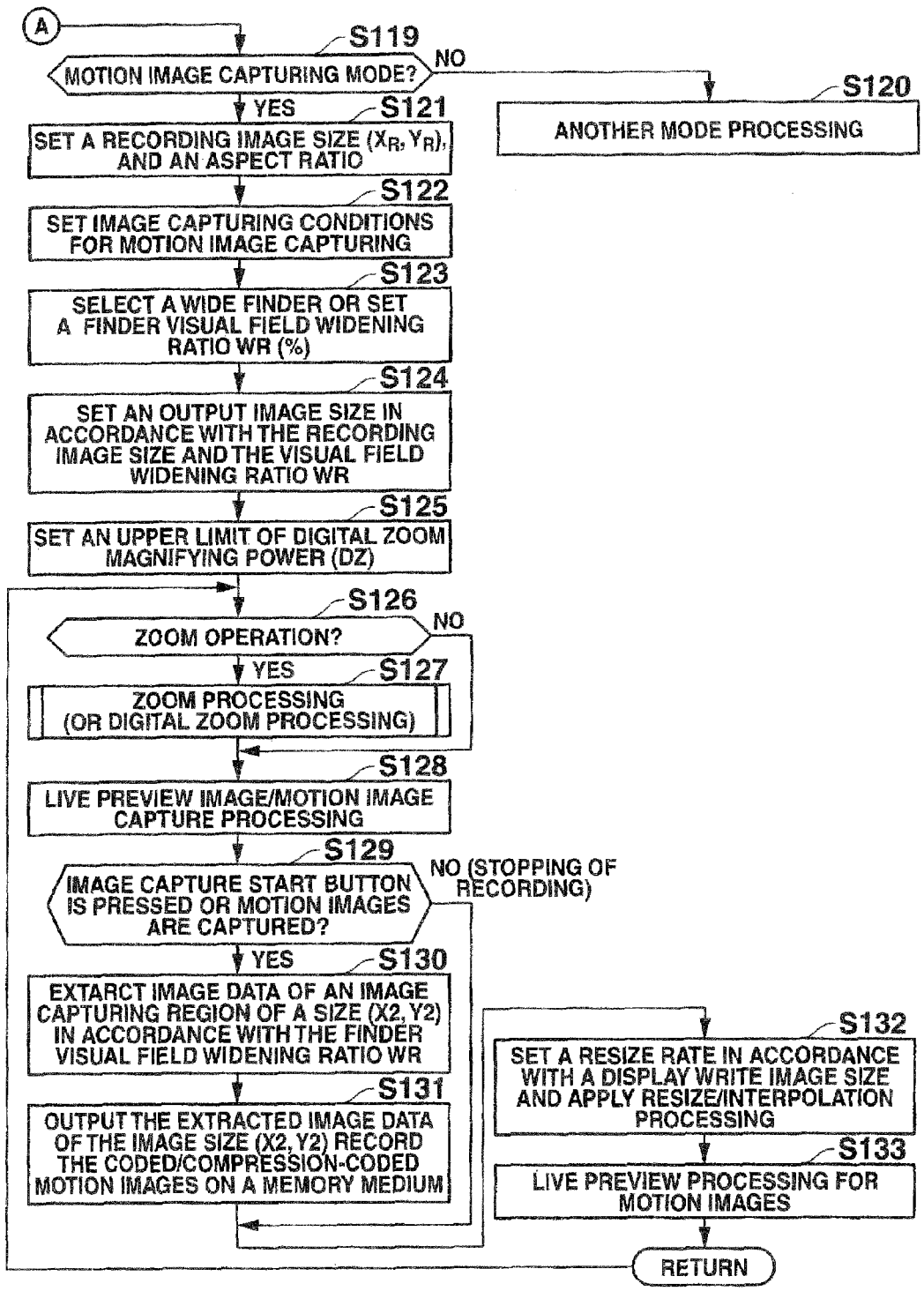
FIG. 4 is a flow chart following FIG. 3.

FIGS. 3 and 4 are a series of flow charts showing a processing procedure in this embodiment. The control circuit 2 performs process shown in the flow charts based on a program stored in the program memory 23, and serves as a processor configured to perform the process shown in FIGS. 3 and 4. First, the control circuit 2 determines whether a still image capturing mode has been set or not (step S101). When the still image capturing mode has not been set, the process proceeds to step S119 of FIG. 4 which will be described later.

When the still image capturing mode has been set, a recording image size (width: $X_R$, height: $Y_R$), an aspect ratio, etc. are set in accordance with user's operation on the user interface 22 (step S102). The recording image size (width: $X_R$, height: $Y_R$) is a size of an image to be recorded on the image memory medium 25. Then, an image capturing mode, image capturing conditions, etc. are set (step S103). After that, selection of a wide finder or a visual field widening ratio WR (%) of the finder is set (step S104).

Figure 5:
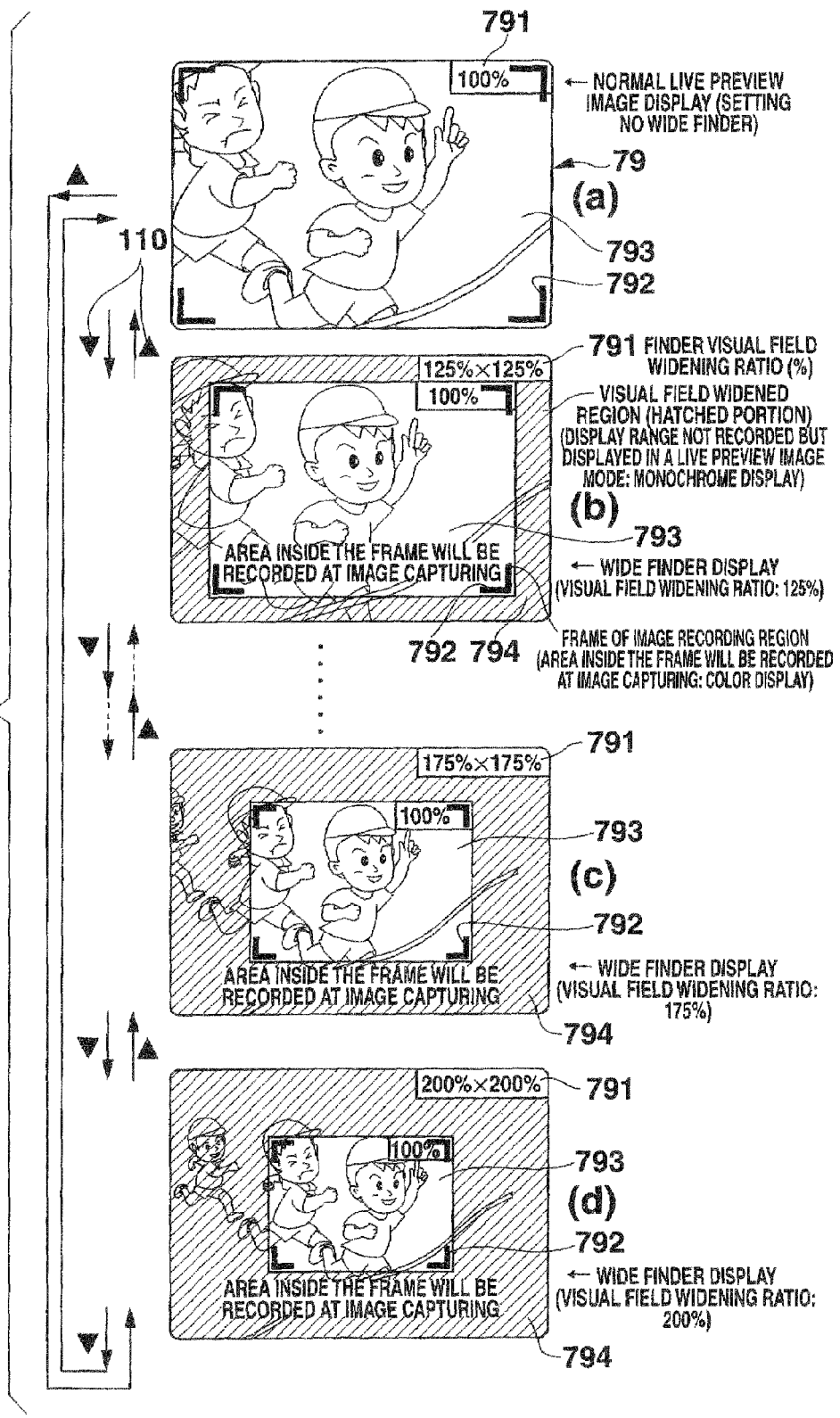
FIG. 5 is a view showing display examples in the embodiment.

FIG. 5 is an illustrative view showing a setting operation to be made in step S104. The visual field widening ratio of a live preview image (i.e. live view image, through-the-lens image or through image) range which is ordinarily set at 100% as shown in section (a) of FIG. 5 can be changed freely up to 200% (both horizontally and vertically) as shown in section (d) of FIG. 5 in accordance with an operation on the cursor keys 110. When the OK key 109 is operated after any value in a range of 100% to 200%×200% is selected by the operation on the cursor keys 110, the visual field widening ratio WR (%) of the finder is set.

The image shown in section (d) of FIG. 5D is an image before digital zoom processing, i.e. an image with a zoom magnifying power of "1". The sections (d), (c), (b) and (a) of FIG. 5 show images arranged in ascending order of digital zoom magnifying power. It is a matter of course that the image with the maximum visual field widening ratio of 200%×200% shown in section (d) of FIG. 5 has the maximum allowable size in the image capturing range of the image capturing device 56.

When the visual field widening ratio WR (%) of the finder is set in this manner, an output image size ($X_{OUT}$, $Y_{OUT}$) which is a size of an image to be output to the display panel 79 is set in accordance with a display write image size ($X_d$, $Y_d$) and the set visual field widening ratio WR (%) by the following expression (step S105).

$$X_{OUT} = (WR/100) \times X_d$$

$$Y_{OUT} = (WR/100) \times Y_d$$

In the expression, the display write image size ($X_d$, $Y_d$) shows both height (the number of pixels in the vertical direction) and width (the number of pixels in the horizontal direction) of an image which is written into the buffer memory 75 and transferred to the display panel 79 through the display driver 78 at the time of normal image capturing without selection of the wide finder. On the other hand, the output image size ($X_{OUT}$, $Y_{OUT}$) shows both height and width of an image which is written into the buffer memory 75 and transferred to the display panel 79 through the display driver 78 after execution of processing in the step S105.

Accordingly, when the display write image size ($X_d$, $Y_d$) is multiplied by (WR/100) based on the visual field widening ratio WR (%) set by the user to thereby calculate the output image size ($X_{OUT}$, $Y_{OUT}$), the output image size ($X_{OUT}$, $Y_{OUT}$) is increased to (WR/100) times as large as the display write image size ($X_d$, $Y_d$). Since WR is not smaller than 100 on this occasion, the output image size ($X_{OUT}$, $Y_{OUT}$) is not smaller than the display write image size ($X_d$, $Y_d$). That is, when WR=200%, the output image size ($X_{OUT}$, $Y_{OUT}$) is calculated as follows.

$$X_{OUT} = (200/100) \times X_d = 2X_d$$

$$Y_{OUT} = (200/100) \times Y_d = 2Y_d$$

Then, an upper limit ($DZ_{max}$) of digital zoom magnifying power (DZ) is set in accordance with a captured full image size ($X_F$, $Y_F$) and the output image size ($X_{OUT}$, $Y_{OUT}$) by the following exemplified expression (step S106).

Example $$DZ_{max} = X_F / X_{OUT}$$

or $DZ_{max} = Y_F / Y_{OUT}$

In the expression, the captured full image size ($X_F$, $Y_F$) is the maximum image size allowed to be captured by the image capturing device 56. Accordingly, the upper limit ($DZ_{max}$) of digital zoom magnifying power (DZ) decreases as the output image size ($X_{OUT}$, $Y_{OUT}$) increases.

Then, the control circuit 2 determines whether a zoom operation has been made or not (step S107). When a zoom operation has been made, zoom processing (or digital zoom processing with minimum deterioration of image quality) is performed (step S108). The digital zoom processing with minimum deterioration of image quality in the step S108 will be described in detail in a flow chart which will be described later.

Successively, a resize rate ($IP_x = X_d/X'$, $IP_y = Y_d/Y'$) is set in accordance with a live preview image size (X', Y') and resize/interpolation is performed to convert the image data into display write image data with the display write image size ($X_d$, $Y_d$) (step S109).

Here, the live preview image size (X', Y') shows both height and width of the live preview image to be displayed on the display panel 79. Accordingly, the display write image size ($X_d$, $Y_d$) is a size allowable to be displayed on the whole screen on the display panel 79.

Further, live preview image display processing (writing into a display RAM) is performed in accordance with the display write image size ($X_d$, $Y_d$), the finder visual field widening ratio WR (%) and the digital zoom magnifying power (DZ). On this occasion, a frame is displayed in a display region corresponding to the recording image size ($X_R$, $Y_R$) set in the step S102 while the visual field widening ratio is displayed. At the same time, an image capturing region is displayed in color while the other region than the image capturing region is displayed in monochrome after conversion of color into monochrome (step S110).

Accordingly, after the processing in the step S110, as shown in sections (a)-(d) of FIG. 5, a visual field widening ratio 791 such as "100%", "125%×125%", etc. is displayed on the display panel 79, a frame 792 is displayed in a display region corresponding to the recording image size ($X_R$, $Y_R$), and an image capturing region 793 is displayed in color while the other region 794 than the image capturing region is displayed in monochrome.

Accordingly, the user can determine whether the visual field widening ratio currently set is proper or not, that is, whether a larger visual field widening ratio should be set or whether a smaller visual field widening ratio should be set, by visually recognizing the displayed visual field widening ratio 791, the displayed image capturing region 793 and the other region 794 than the image capturing region.

In addition, the user can capture a still image while visually recognizing whether a desired image portion is contained in the image capturing region 793 or not, by visually recognizing the frame 792 and the live preview image portion in the image capturing region 793 displayed in color.

When a live preview image is displayed in the other region 794 than the image capturing region as shown in sections (b)-(d) of FIG. 5, it is preferable that a character string "*area inside the frame will be recorded at image capturing" is displayed in the other region 794 than the image capturing region. In this manner, even if the user is a beginner, the user can perform image capturing while confirming whether a desired image portion is contained in the image capturing region 793 or not, by recognizing that the live preview image portion in the image capturing region 793 is an image portion to be recorded.

Then, the control circuit 2 determines whether the release button 104 has been half-pressed (or AF/AE-locked) or not (step S111). When the release button 104 has not been half-pressed, the routine of processing returns to the step S107. When the release button 104 has been half-pressed, the control circuit 2 performs photometric processing and AF/AE lock processing (step S112) and then waits for full press of the release button 104 (step S113).

When the release button 104 has been full-pressed, the control circuit 2 performs light exposure and image capture processing and reads an image of the selected region without pixel addition and in accordance with the digital zoom magnifying power (DZ) (step S114). That is, an image (an image of the selected region) corresponding to the image capturing region 793 and the other region 794 than the image capturing region as shown in sections (a)-(d) of FIG. 5 is read from the image capturing device 56 without addition of any pixel. Accordingly, the image read in the step S114 contains an image portion corresponding to the image capturing region 793 and an image portion corresponding to the other region 794 than the image capturing region.

Successively, while the image read in the step S114 is regarded as a photographic image (X", Y"), captured image data in an image capturing region of an image size (X2, Y2) is extracted from the center of the photographic image (X", Y") in accordance with the finder visual field widening ratio WR (%) by the following expression.

$$X2=X''/(WR/100)$$

$$Y2=Y''/(WR/100)$$

The extracted image with the image size (X2, Y2) is resized for recording and interpolated in accordance with necessity (S116), based on the following resize rate ($IP_x$, $IP_y$) which is set in accordance with the recording image size ($X_R$, $Y_R$) set in the step S102.

$$IP_x=X_R/X2$$

$$IP_y=Y_R/Y2$$

The resized photographic image is displayed for review or displayed for preview before recording on the display panel 79 (step S117). Then, the resized photographic image is coded, compression-coded and recorded on a memory medium (the image memory medium 25 or the disk platter 47) (step S118). That is, while the image capturing device 56 and the DSP module 63 are controlled based on the image capturing conditions set in the step S103, light exposure and image capturing operation is performed to acquire a high-resolution subject image signal for still recording. The subject image signal is encoded into compression-coded data in accordance with the JPEG standard etc. or into non-compression-coded data such as RAW data by the still image CODEC (coder/decoder) 76 and recorded on the image memory medium 25 or the disk platter 47.

The image recorded on the memory medium is a captured image which was obtained when the user operated the release button 104 while visually recognizing the frame 792 and a live preview image portion in the image capturing region 793 displayed in color as described above. Accordingly, the desired image portion is surely contained in the captured image, so that an image range containing the desired image portion can be captured and recorded easily.

On the other hand, when the still image capturing mode has not been set as a result of the determination in the step S101, the routine of processing goes from the step S101 to the step S119 in FIG. 4, in which the control circuit 2 determines whether a motion image capturing mode has been set or not. When the motion image capturing made has not been set, the process of routine goes to another mode processing (step S120).

When the motion image capturing mode has been set, a recording image size (width: $X_R$, height: $Y_R$), an aspect ratio, etc. are set in accordance with user's operation on the user interface 22 (step S121). The recording image size (width: $X_R$, height: $Y_R$) is a one-frame size of a motion image to be recorded on the image memory medium 25. Then, image capturing conditions for motion image capturing are set (step S122). After the step S122, selection of a wide finder or a visual field widening ratio WR (%) of the finder is set (step S123). The setting operation in the step S123 is the same as in the step S104 which has been described with reference to the sections (a)-(d) of FIG. 5.

When the finder visual field widening ratio WR (%) has been set, an output image size ($X_{OUT}$, $Y_{OUT}$) which is a size of an image to be output to the display panel 79 is set in accordance with the recording image size ($X_R$, $Y_R$) set in the step S121 and the visual field widening ratio WR (%) set in the step S123 by the following expression (step S124).

$$X_{OUT}=(WR/100)\times X_R$$

$$Y_{OUT}=(WR/100)\times Y_R$$

Accordingly, the output image size ($X_{OUT}$, $Y_{OUT}$) is increased to (WR/100) times as large as the recording image size ($X_R$, $Y_R$). Since WR is larger than 100 on this occasion, the output image size ($X_{OUT}$, $Y_{OUT}$) is not smaller than the recording image size ($X_R$, $Y_R$). That is, when WR=200%, the output image size ($X_{OUT}$, $Y_{OUT}$) is given as follows.

$$X_{OUT}=(200/100)\times X_R=2X_R$$

$$Y_{OUT}=(200/100)\times Y_R=2Y_R$$

Then, an upper limit ($DZ_{max}$) of digital zoom magnifying power (DZ) is set in accordance with a captured full image size ($X_F$, $Y_F$) and the output image size ($X_{OUT}$, $Y_{OUT}$) by the following exemplified expression in the same manner as the processing in the step S106 (step S125).

Example $$DZ_{max}=X_F/X_{OUT}$$

or $DZ_{max}=Y_F/Y_{OUT}$

The control circuit 2 determines whether a zoom operation has been made or not (step S126). When a zoom operation has been made, zoom processing (or digital zoom processing with minimum deterioration of image quality) is performed (step S127). The digital zoom processing with minimum deterioration of image quality in the step S127 will be described in detail with reference to a flow chart which will be described later.

Successively, live preview image/motion image capturing processing is performed so that an image of the selected region is read in a selected addition mode in accordance with the digital zoom magnifying power (DZ) (step S128). That is, an image (an image of a selected region) equivalent to an image containing the image capturing region 793 and the other region 794 than the image capturing region as shown in the sections (a)-(d) of FIG. 5 is read from the image capturing device 56 while pixel addition is performed on the image in an addition mode selected in advance.

Then, the control circuit 2 determines whether an image capturing start button (release button 104) has been pressed or not or whether motion images are being captured or not (step S129). When the determination results is NO, the routine of processing proceeds to step S132. When the image capturing start button has been pressed or motion images are being captured, captured image data in an image capturing region of a size (X2, Y2) are extracted from each captured image of a size (X', Y') in accordance with the finder visual field widening ratio WR (%) on the assumption that the image read in the step S128 is used as the captured image of the size (X', Y') (step S130).

$$X2=X'\times(WR/100)$$

$$Y2=Y'\times(WR/100)$$

The extracted image data of the image size (X2, Y2) are sequentially output to the motion image CODEC (coder/decoder) 77 so that the motion images are coded/compression-coded and recorded on a memory medium (step S131). That is, while the image capturing device 56 and the DSP module 63 are controlled based on the image capturing conditions of motion image capturing set in the step S122, light exposure and image capturing operation is performed to acquire a high-resolution subject image signal for motion image recording. The subject image signal is compression-coded in accordance with a compression method such as MPEG4 or H.264/AVC by the image CODEC (coder/decoder) 77 and recorded on the image memory medium 25 or the disk platter 47 in a file format such as AVI or MP4.

Further, the captured frame image of the image size (X', Y') is resized for recording and resized/interpolated for display based on the following resize rate ($IP_x$, $IP_y$) set in accordance with the display write image size ($X_d$, $Y_d$) which has been described in the step S105 (step S132).

$$IP_x=X_d/X'$$

$$IP_y=Y_d/X'$$

Live preview image display processing (writing into a display RAM) for motion images is performed. On this occasion, a frame is displayed in an image capturing region corresponding to the recording image size (XR, YR) set in the step S121, the visual field widening ratio is displayed, and the image capturing region is displayed in color while the other region than the image capturing region is displayed in monochrome after conversion of color into monochrome (step S133).

Accordingly, as a result of processing in the step S133, on the display panel 79, a visual field widening ratio 791 such as "100%" or "125%×125%" is displayed, a frame 792 is displayed in a display region corresponding to the recording image size ($X_R$, $Y_R$) and an image capturing region 793 is displayed in color while the other region 794 than the image capturing region is displayed in monochrome, as shown in the sections (a)-(d) of FIG. 5.

Accordingly, the user can perform motion image capturing while visually recognizing whether a desired image portion is contained in the image capturing region 793 or not, by visually recognizing the frame 792 and a live preview image portion in the image capturing region 793 displayed in color.

Figure 6:
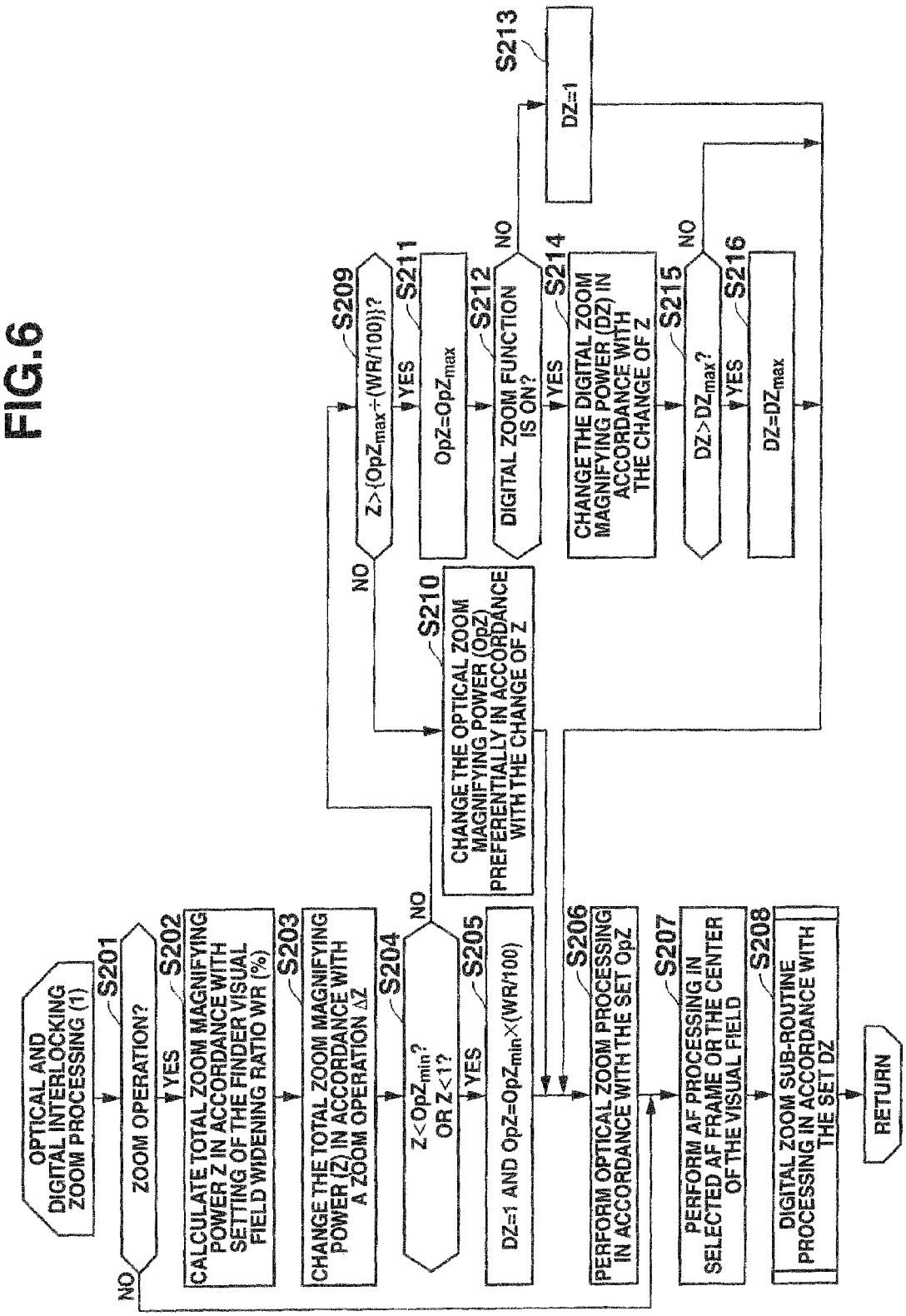
FIG. 6 is a flow chart showing optical and digital interlocking zoom processing (1).

FIG. 6 is a flow chart showing optical and digital interlocking zoom processing (1) which is a first processing example of zoom processing executed in the steps S108 and S128. Before processing according to the flow chart is started, initial setting is performed. That is, the output image size for still image is set by processing in the step S105 in the main routine shown in FIGS. 3 and 4.

$$X_{OUT}=(WR/100)\times X_d$$

$$Y_{OUT}=(WR/100)\times Y_d$$

The output image size for motion image is set by processing in the step S124.

$$X_{OUT}=(WR/100)\times X_R$$

$$Y_{OUT}=(WR/100)\times Y_R$$

Further, the upper limit DZmax of digital zoom is set by processing in the step S106 or S125.

$$DZ_{max}=X_F/X_{OUT}$$

$$\text{or } DZ_{max}=Y_F/Y_{OUT}$$

In this state, determination is made as to whether a zoom operation has been made or not (step S201). When a zoom operation has been made, a total zoom magnifying power Z is calculated in accordance with the setting of the finder visual field widening ratio WR (%) by the following expression (step S202).

$$Z=OpZ\times DZ/(WR/100)$$

where OpZ is an optical zoom magnifying power of the image capturing optical system 55

Accordingly, the total zoom magnifying power Z satisfies Z=OpZ×DZ when WR=100%.

Then, the total zoom magnifying power (Z) is changed in accordance with a zoom operation (zoom operation amount) ΔZ of the zoom lever 105 by the following expression (step S203).

$$Z=Z\pm\Delta Z$$

Determination is made as to whether Z is smaller than $OPZ_{min}$ or not ($OPZ_{min}$: a minimum value of the optical zoom magnifying power) or whether Z is smaller than 1 or not (step S204). When the determination in the step S204 results in YES so that the total zoom magnifying power Z is smaller than $OPZ_{min}$ or smaller than 1, the digital zoom magnifying power DZ is set at 1 while the optical zoom magnifying power OpZ is set at $OPZ_{min}\times(WR/100)$ (step S205).

Next, optical zoom processing is performed in accordance with the set optical zoom magnifying power OpZ so that the zoom lens actuator 33 is controlled to actuate the zoom lens (step S206). Further, AF processing is performed on a selected AP frame (one AF frame selected in advance when there are a plurality of AF frames) or the center of the visual field so that the focus lens actuator 32 is controlled to actuate the focus lens (step S207). Then, in accordance with the set DZ, the routine of processing shifts to a digital zoom processing sub-routine (with minimum deterioration of image quality) which will be described later (step S208).

When the determination in the step S204 results in NO so that the total zoom magnifying power Z is not smaller than $OPZ_{min}$ or not smaller than 1, determination is made as to whether Z is larger than $\{OPZ_{max}\times(WR/100)\}$ (in which $OPZ_{max}$ is a maximum optical zoom magnifying power) (step S209). When the determination in the step S209 results in NO so that the total zoom magnifying power Z is not larger than a value obtained by dividing the maximum optical zoom magnifying power $OPZ_{max}$ by (WR/100), DZ=1 and OpZ=Z× (WR/100) are set in order to change the optical zoom magnifying power (OpZ) preferentially in accordance with the change of the total zoom magnifying power Z (step S210). Then, the routine of processing proceeds to the step S206.

When the determination in the step S209 results in YES, OPZ=$OPZ_{max}$ is set (step S211). Then, determination is made as to whether the digital zoom function has been set to be ON or not (step S212). When the digital zoom function has not been set to be ON, DZ=1 is set (step S213) and then the routine of processing proceeds to the step S206. When the digital zoom function has been set to be ON, DZ=(WR/100)× Z/$OPZ_{max}$ is set in order to change the digital zoom magnifying power (DZ) in accordance with the change of the total zoom magnifying power Z (step S214).

Determination is made as to whether DZ set in the step S214 exceeds a maximum digital zoom magnifying power $DZ_{max}$ (step S215). When DZ does not exceed the maximum digital zoom magnifying power $DZ_{max}$, the routine of processing proceeds to the step S206. On the other hand, when DZ exceeds the maximum digital zoom magnifying power $DZ_{max}$, the set digital zoom magnifying power DZ is limited to the maximum digital zoom magnifying power $DZ_{max}$ (step S216) and then the routine of processing shifts to the step S206.

Hence, according to the aforementioned optical and digital interlocking zoom processing (1), it is possible to change the optical zoom magnifying power (OpZ) in a range of from $OpZ_{min}$ to $OPZ_{max}$ because control can be made to change the optical zoom magnifying power (OpZ) preferentially (DZ=1 and OpZ=Z×(WR/100)) when the total zoom magnifying power (Z) is in the operating range (Zmin≦Z≦{$OpZ_{max}$/(WR/100)} of the optical zoom magnifying power (OpZ).

Moreover, control can be made so that the digital zoom magnifying power (DZ) is changed in accordance with the change of the total zoom magnifying power (Z) when the digital zoom function is turned on while the optical zoom magnifying power (OpZ) is kept at maximum (OpZ>$OPZ_{max}$) in the case where the total zoom magnifying power (Z) exceeds the maximum value of the optical zoom magnifying power (OpZ) in consideration of the visual field widening ratio (WR) (Z>{$OPZ_{max}$/(WR/100)}). Accordingly, DZ changes in a range of from 1 to $OPZ_{max}$.

In this manner, numerical values shown in FIG. 7 by way of example are obtained when the optical zoom is (×1 to ×5), the captured full image size is ($X_F$=2880, $Y_F$=2160) and the display write image size is ($X_d$=640, $Y_d$=480) (the recording image size is ($X_R$=640, $Y_R$=480) for motion image capturing).

Optical zoom processing is performed in such a manner that the zoom lens is driven in accordance with the optical zoom magnifying power (OpZ) set as described above. Or AF is performed in such a manner that the focus lens is driven based on in-focus detection information such as high-frequency components or contrast values detected from a captured image signal of the region in the selected AF frame or in the center of the visual field. In addition, live preview image display processing is performed based on captured image data read in accordance with the set digital zoom magnifying power (DZ) by the "digital zoom processing sub-routine with minimum deterioration of image quality" which will be described later.

Figure 8:
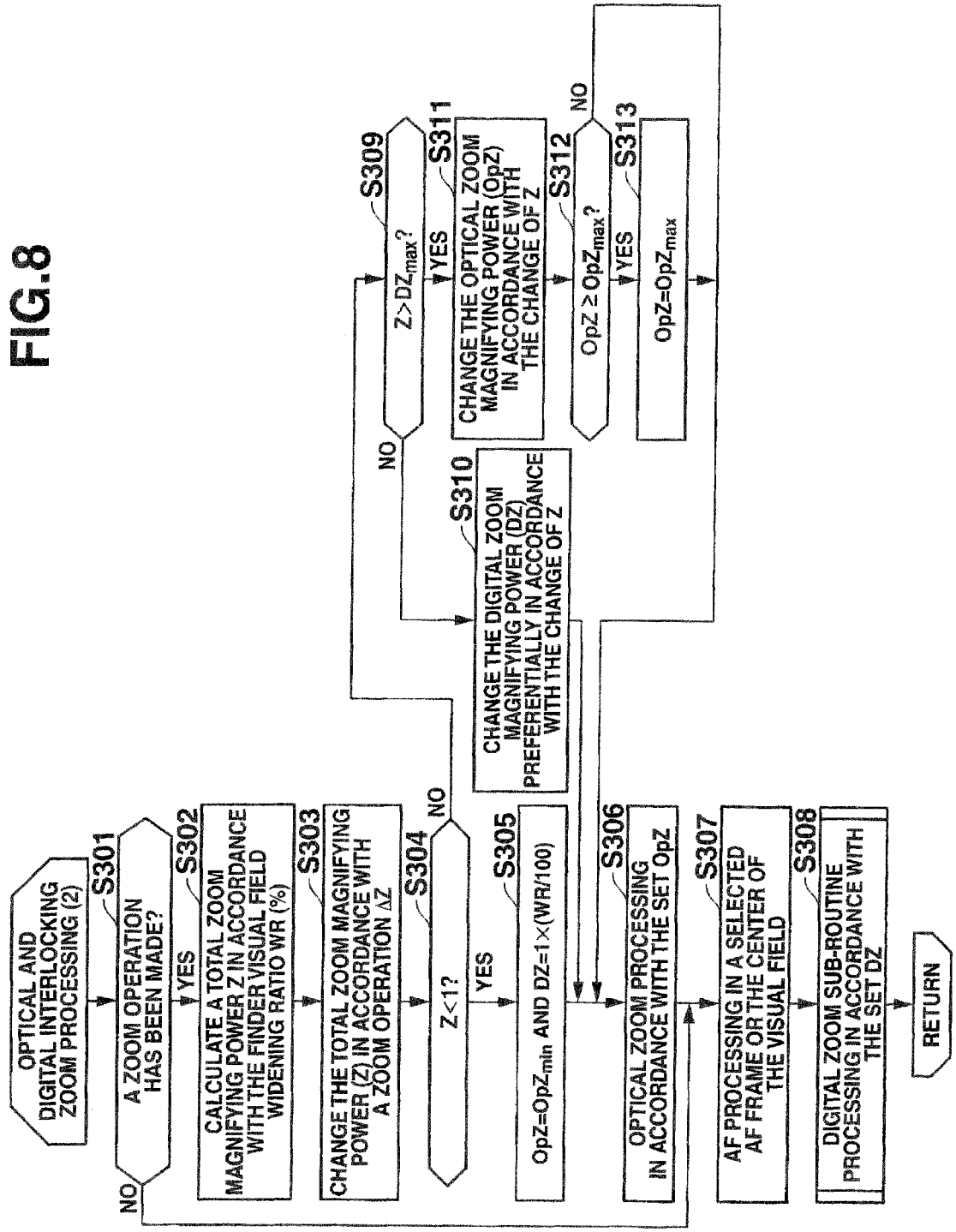
FIG. 8 is a flow chart showing optical and digital interlocking zoom processing (2).

FIG. 8 is a flow chart showing optical and digital interlocking zoom processing (2) which is a second processing example of zoom processing executed in the steps S108 and S128. Before processing based on this flow chart is started, initial setting is performed. That is, the output image size for still image is set by processing in the step S105 in the main routine shown in FIGS. 3 and 4.

$$X_{OUT}=(WR/100)\times X_d$$

$$Y_{OUT}\times(WR/100)\times Y_d$$

The output image size for motion image is set by processing in the step S124.

$$X_{OUT}=(WR/100)\times X_R$$

$$Y_{OUT}=(WR/100)\times Y_R$$

The upper limit $DZ_{max}$ of digital zoom is set by processing in the step S106 or S125.

$$DZ_{max}=X_F/X_{OUT}$$

$$\text{or } DZ_{max}=Y_F/Y_{OUT}$$

In this state, determination is made as to whether zoom operation has been made or not (step S301). When zoom operation has been made, a total zoom magnifying power Z is calculated in accordance with the setting of the finder visual field widening ratio WR (%) by the following expression (step S302).

$$Z=OpZ\times DZ/(WR/100)$$

where OpZ is an optical zoom magnifying power of the image capturing optical system 55

Accordingly, the total zoom magnifying power Z satisfies Z=OpZ×DZ when WR=100%.

Then, the total zoom magnifying power (Z) is changed in accordance with a zoom operation (zoom operation amount) ΔZ of the zoom lever 105 by the following expression (step S303).

$$Z=Z\pm\Delta Z$$

Determination is made as to whether Z is smaller than 1 or not (step S304). When the determination of the step S304 results in YES so that the total zoom magnifying power Z is smaller than 1, the optical zoom magnifying power OpZ and the digital zoom magnifying power DZ are set at OPZ=$OPZ_{min}$ and DZ=1×(WR/100) respectively.

Successively, optical zoom processing is performed in accordance with the set optical zoom magnifying power OpZ to control the zoom lens actuator 33 to actuate the zoom lens (step S306). Further, AF processing is performed based on a selected AF frame (an AF frame selected in advance when there are a plurality of AF frames) or the center of the visual field to control the focus lens actuator 32 to actuate the focus lens (step S307). Then, the routine of processing shifts to a digital zoom processing sub-routine (with minimum deterioration of image quality) which will be described later in accordance with the set DZ (step S308).

On the other hand, when the determination in the step S304 results in NO so that the total zoom magnifying power Z is not smaller than 1, determination is made as to whether Z is larger than $DZ_{max}$ or not (step S309). When the determination in the step S309 results in NO so that the total zoom magnifying power Z is not larger than a maximum digital zoom magnifying power $DZ_{max}$, OPZ=$OPZ_{min}$ and DZ=(WR/100)×Z/$OPZ_{min}$ are set to change the digital zoom magnifying power (DZ) preferentially in accordance with the change of the total zoom magnifying power Z (step S310). Then, the routine of processing proceeds to the step S306.

When the determination in the step S309 results in YES, DZ=$DZ_{max}$ and OpZ=(WR/100)×Z/$DZ_{max}$ are set to change the optical zoom magnifying power (OpZ) in accordance with the change of Z (step S311). Then, determination is made as to whether OpZ set in the step S311 satisfies the relation OPZ≧$OpZ_{max}$ or not (step S312). When OpZ does not satisfy the relation OPZ≧$OPZ_{max}$, that is, when the optical zoom magnifying power OpZ is smaller than the maximum optical zoom magnifying power $OpZ_{max}$, the routine of processing proceeds to the step S306. When OpZ satisfies the relation OPZ≧$OPZ_{max}$, that is, when the optical zoom magnifying power OpZ is not smaller than the maximum optical zoom magnifying power $OPZ_{max}$, the set optical zoom magnifying power OpZ is limited to the maximum optical zoom magnifying power $OPZ_{max}$ (step S313) and then the routine of processing proceeds to the step S306.

Hence, according to the aforementioned optical and digital interlocking zoom processing (2), OpZ can be changed in a range of from $OPZ_{min}$ to $OpZ_{max}$ because control can be made so that the total zoom magnifying power (Z) is set to be changed (Z=±ΔZ) in accordance with a zoom operation and ($OpZ=OpZ_{min}$ and $DZ=(WR/100) \times Z/DZ_{max}$) are set to change the digital zoom magnifying power (DZ) preferentially in accordance with the change of the total zoom magnifying power (Z) when the total zoom magnifying power (Z) is in an operating range ($1 \leq Z \leq DZ_{max}$) of digital zoom magnifying power (DZ).

Consequently, numerical values shown in FIG. 9 by way of example can be obtained when the optical zoom is (×1 to ×5), the captured full image size is ($X_F$=2880, $Y_F$=2160) and the display write image size is ($X_d$=640, $Y_d$=480) (the recording image size is ($X_R$=640, $Y_S$=480) for motion image capturing).

Figure 10:
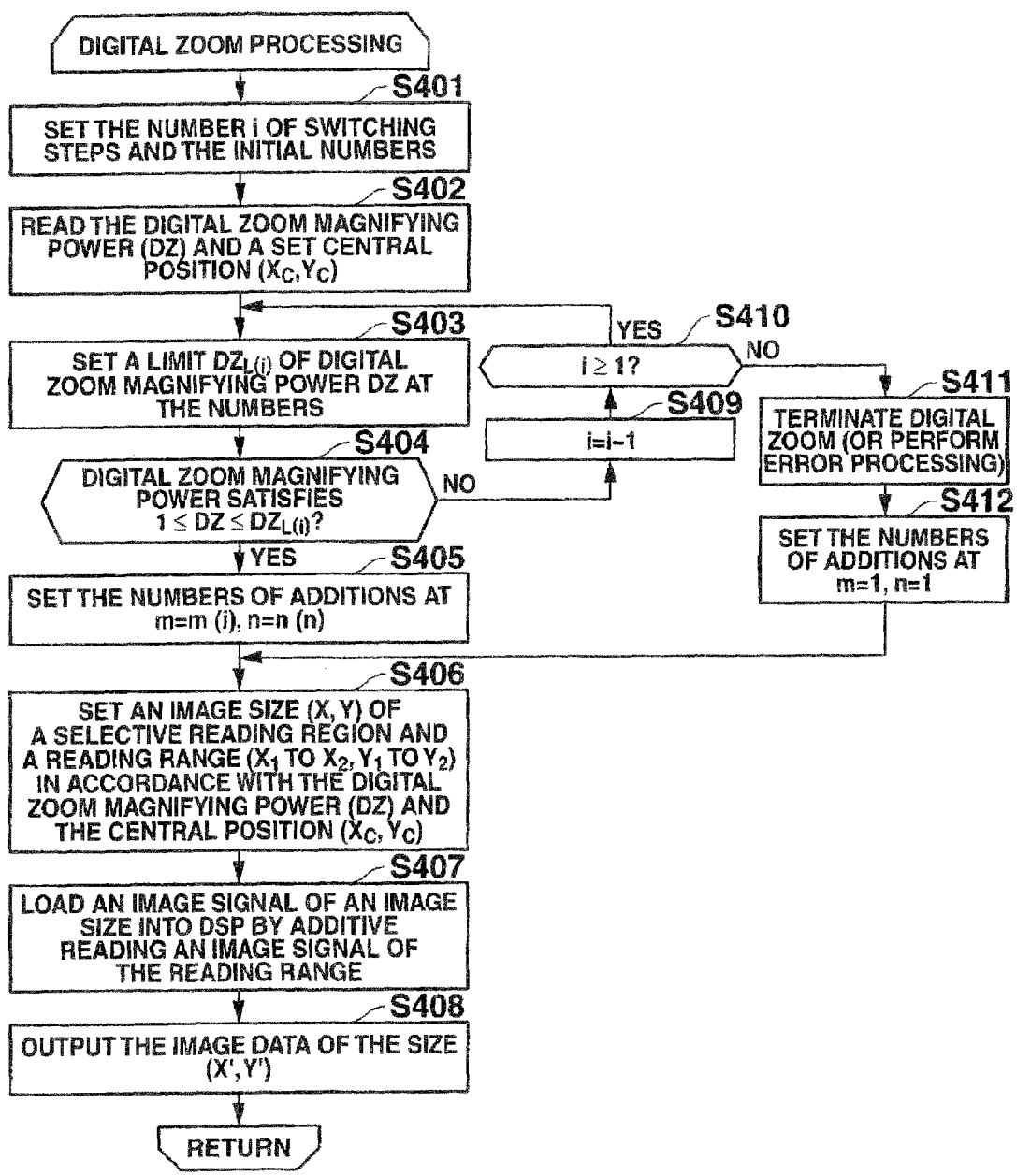
FIG. 10 is a flow chart showing a sub-routine of digital zoom processing with minimum deterioration of image quality.

FIG. 10 is a flow chart showing the digital zoom processing sub-routine (with minimum deterioration of image quality) executed in the steps S208 and S308. First, the (integer) number i of switching steps and the (integer) initial numbers m=m(i) and n=n(i) of additions are set as shown in the following example (step S401).

Example $i=3, m(i)=m3, n(i)=n3$ are set

A digital zoom magnifying power (DZ) and a set central position ($X_C$, $Y_C$) are read (step S402). A limit (changeable magnifying power) $DZ_{L(i)}$ of digital zoom magnifying power DZ (for minimum deterioration of image quality) in the number m(i) or n(i) of additions for additive reading in each step is set based on the full image size ($X_F$, $Y_F$) and the output image size ($X_{OUT}$, $Y_{OUT}$) of the image capturing device as follows (step S403).

$$DZ_{L(i)}=INT\{X_F/m(i)\}/X_{OUT}$$

or $DZ_{L(i)}=INT\{Y_F/n(i)\}/Y_{OUT}$

Accordingly, assuming $m_1=n_1=1$, $m_2=n_2=2$, $m_3=n_3=3$ . . . , for example, in the condition of $X_F$=2880, $Y_F$=2160, $X_{OUT}$=640 and $Y_{OUT}$=480, then the limit magnifying power $DZ_{L(i)}$ is calculated as follows.

Limit Magnifying Power $DZ_{L1}=INT(2880/1)/640=4.5$ when the number of additions is $m_1$ Limit Magnifying Power $DZ_{L2}=INT(2880/2)/640=2.25$ when the number of addition number is $m_2$ Limit Magnifying Power $DZ_{L3}=INT(2880/3)/640=1.5$ when the number of additions is $m_3$ Limit Magnifying Power $DZ_{L4}=INT(2880/4)/640=1.125$ when the number of additions is $m_4$ Then, determination is made as to whether the digital zoom magnifying power (DZ) satisfies the relation "$1 \leq DZ \leq DZ_{L(i)}$" or not (step S404). When the determination in the step S404 results in YES, the numbers of additions are set at m=m(i) and n=n(i) (step S405). Accordingly, assuming that the initial numbers of additions are started at i=3 and m=n=3 in the condition of XF=2880, YF=2160, XOUT=640 and YOUT=480, then the numbers of additions are set as follows.

$m=n=3$ (3×3 additive reading) when DZ is in a range of from 1 to 1.5

$m=n=2$ (2×2 additive reading) when DZ is in a range of from 1.5 to 2.25

$m=n=1$ (1×1 non-additive reading) when DZ is in a range of from 2.25 to 4.5

Successively, an image size (X, Y) and a reading range ($X_1$ to $X_2$, $Y_1$ to $Y_2$) of a selected reading region are set in accordance with the digital zoom magnifying power (DZ) and the central position ($X_c$, $Y_c$) as follows (step S406).

$X=INT(X_F/DZ), Y=INT(Y_F/DZ)$, $X_1=X_C-X/2, X_2=X_C+X/2$, and $Y_1=Y_C-Y/2, Y_2=Y_CY/2$, in which:

$X_1=0, X_2=X$ when $X_1<0$;

$Y_1=0, Y_2=X$ when $Y_1<0$;

$X_1=X_F-X, X_2=X_2=X_F$ when $X_2>X_F$; and $Y_1=Y_F-Y, Y_2=Y_F$ when $Y_2>Y_F$ Accordingly, assuming the condition of $X_F$=2880, $Y_F$=2160 and DZ=1.2, the image size is calculated as follows.

$X=INT(X_F/DZ)=(2280/1.2)=2400$ $Y=INT(Y_F/DZ)=(2160/1.2)=1800$

Then, an image signal of the reading range ($X_1$ to $X_2$, $Y_1$ to $Y_2$) is read from the image capturing device while addition (or no addition) is performed in accordance with the numbers (m, n) of additions so that an image signal of an image size (X', Y')=(X/m, Y/n) is loaded into the DSP module 63 (step S407). Then, image data of the size (X', Y') is output (step S408).

Accordingly, assuming the condition of DZ=1.2 and the numbers of additions m=3 and n=3, a (3×3) additive image of 800×600 pixels is obtained because the image size (X', Y') is calculated as follows.

$X'=X/m=(2400/3)=800$ $Y'=Y/n=(1800/3)=600$

On the other hand, when the determination in the step S404 results in NO, the value of "i" is decremented by 1 (step S409) and determination is made as to whether the decremented value of "i" satisfies the relation $i \geq 1$ or not (step S410). While the decremented value of "i" satisfies the relation $i \geq 1$, that is, while the decremented value of "i" is a positive value, the routine of processing goes from the step S410 back to the step S403. Then, processing in the step S403 is performed in the condition that the decremented value "i" is substituted. When the determination in the step S404 consequently results in YES, processing in the step S405 and steps following the step 405 is performed.

However, when the value of "i" is decremented to "0" in the step S409, the determination in the step S410 results in NO. In this case, the digital zoom is terminated or error processing is performed (step S411). Then, both the numbers m and n of additions are set at "1" as a minimum value and processing in the step S406 and steps following the step S406 is performed.

When, for example, the image capturing device 56 is provided with a CCD image sensor, signal charges generated in a photodiode by incident light are transferred directly without amplification and sequentially by vertical and horizontal CCD transfer paths before the signal charges are amplified in the form of signal voltage by an FD (Floating Diffusion) amplifier in an output circuit so that the signal voltage is output from the output circuit. The captured image signal output from the CCD is subjected to noise removal and sample & hold processing by a CDS (Correlated Double Sampling) circuit, amplified by an AGC (Automatic Gain Control) amplifier, converted into a digital captured image signal by an ADC (A/C converter) and output to a DSP (Digital Signal Processing) circuit.

On the other hand, when the image capturing device is provided with a CMOS (Complementary Metal Oxide Semiconductor) image sensor, an amplification device (amplifier) is built in each of photodiode-including unit pixel circuits in a general APS (active pixel sensor) type CMOS sensor as shown in FIG. 2. Signal charges obtained by photoelectric conversion in respective photodiodes are once amplified by respective amplifiers in the pixel circuits so that captured image signals selected in accordance with respective pixels by an XY addressing method based on a row address selection signal given from a vertical scanning circuit and a column selection signal given from a horizontal scanning circuit can be successively extracted as voltages or currents from an output. In the CMOS sensor, only a required region can be extracted and read at a high speed by digital zoom processing because only captured image signals of arbitrary pixels or regions can be extracted in arbitrary order without necessity of such sequential extraction as in the CCD.

Although the CCD is susceptible to smearing and noise because signal charges must be transferred directly, the CMOS sensor is resistant to transmission noise because respective pixel circuits are electrically separated from one another so that random access reading from each pixel can be performed. Moreover, the CMOS sensor has an advantage that various CMOS circuits, digital logic circuits such as adding circuits, etc. can be highly integrated so as to be incorporated together relatively easily in the periphery of the image sensor module by the same production process as in a CMOS LSI, etc. On the other hand, the CMOS sensor has a disadvantage that fixed pattern noise (FPN), dark current and KTC noise become large because of individual difference between devices in terms of thresholds of amplifiers for respective pixels. However, when the same configuration (as in the CCD) using an embedded photodiode and an FD amplifier is applied to the CMOS sensor, both dark current and KTC noise can be reduced. When signals before and after resetting of the photodiode are subtracted from each other by a column type CDS/ADC circuit or the like provided in a column circuit arranged in parallel with each column signal line, fixed pattern noise can be removed. When an A/D converter such as an integrating A/D converter, a cyclic A/D converter or a sequential A/D converter is incorporated in each column circuit, a captured image signal can be output easily as a digital signal.

Figure 11:
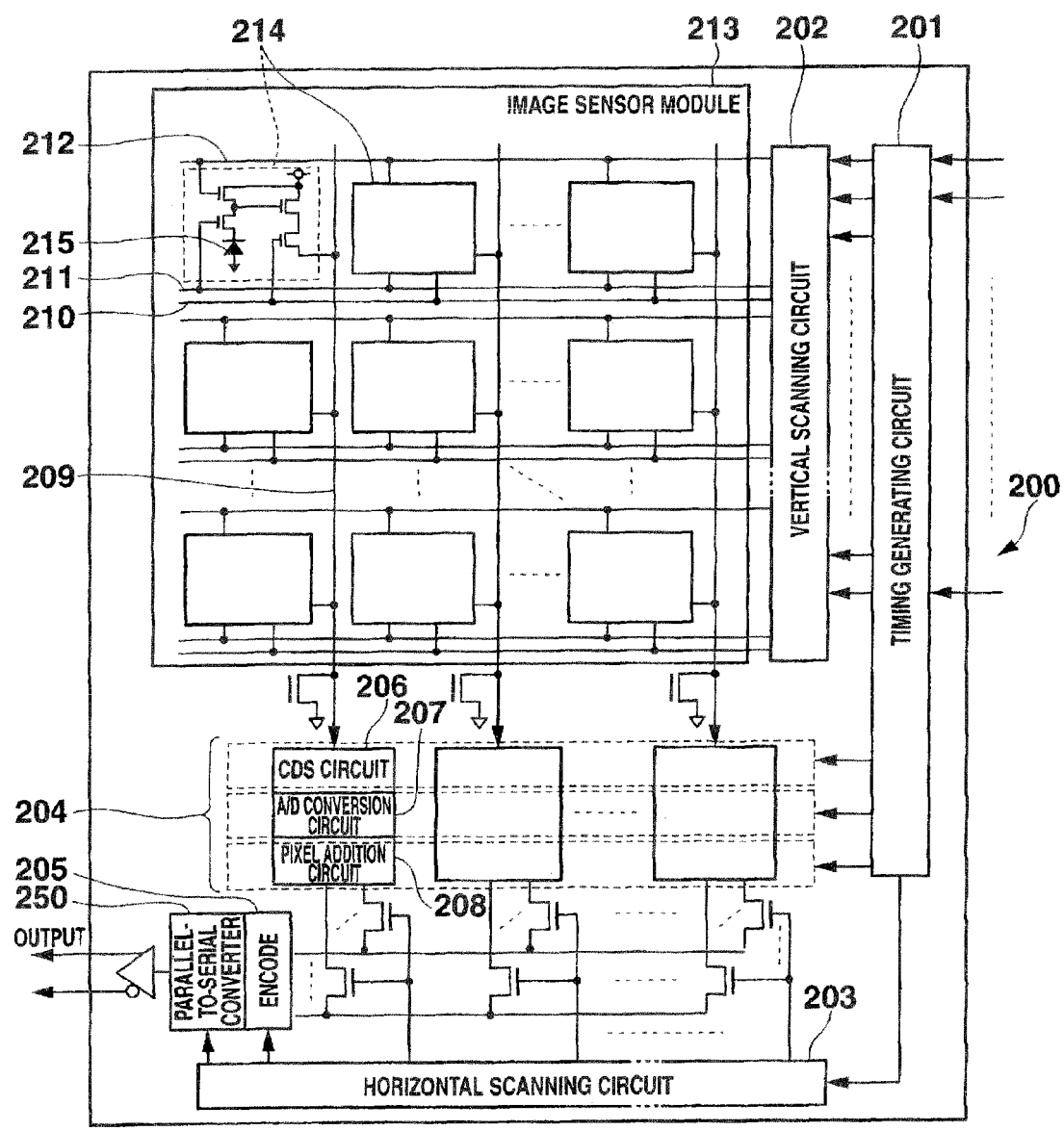
FIG. 11 is a view showing an example of circuit configuration of an image capturing device.

An image capturing device 200 shown in FIG. 11 is preferably used as the image capturing device used in the digital camera 100 according to this embodiment so that an image region of an arbitrary size can be selected to make it possible to perform selective reading for reading out a captured image signal of pixels in the selected region. That is, the image capturing device 200 has a vertical scanning circuit 202, a horizontal scanning circuit 203 and a column circuit unit 204 which are connected to a timing generating circuit 201. The image capturing device 200 further has a parallel-to-serial converter 250, and an encoder 205. Circuits each having a combination of a CDS circuit 206, an A/D conversion circuit 207 and a pixel addition circuit 208 are arranged in the column circuit unit 204 so that column signal lines 209 are connected to the circuits respectively. On the other hand, row selection lines (address lines) 210, transfer TC lines (row reading lines) 211 and row reset lines 212 are connected to the vertical scanning circuit 202. In addition, unit pixel circuits 214 are provided in an image sensor module 213. Each of the unit pixel circuits 214 is provided with a photodiode 215 connected to one of the column signal lines 209, one of the row selection lines (address lines) 210, one of the transfer TC lines (row reading lines) 211 and one of the row reset lines 212.

Accordingly, each pixel addition circuit 208 for adding signals of adjacent pixels of the same color (filter) as digital signals is provided as a stage posterior to the CDS circuit 206 and the A/D circuit 207 in the column circuit unit 204 to thereby configure the image capturing device 200 so that a captured image signal obtained by adding pixel data in a selected region by a predetermined number of pixels in accordance with any row or column can be read when the digital zoom is used. Moreover, in live preview image or motion image capturing, the captured image signal can be converted into a captured image signal small in quantity of image data so that the captured image signal small in quantity of image data can be output even at a high-speed rate.

For the captured image signal of the selected region read selectively and the captured image signal after pixel addition, column signals selected based on the column selection signal of the horizontal scanning circuit 202 are successively output from the CDS circuits 206 and the A/D circuits 207 of the column circuit unit 204. On this occasion, the captured image signals are output as parallel digital signals synchronized with high-speed clocks or parallel digital signals are coded and converted into a serial digital captured image signal by the parallel-to-serial conversion circuit and the serial digital captured image signal is output so that a captured image signal of high resolution can be transferred and output to the DSP at a high-speed frame rate.

Assume that the image capturing device 56 is a CMOS image sensor. When a captured image signal subjected to noise removal and analog-to-digital conversion by the built-in CDS/ADC circuit of the CMOS sensor and transferred as a parallel or serial digital signal from the built-in high-speed output circuit of the CMOS sensor is input to the DSP module 63, the DSP module 63 first performs white balance adjustment and color balance adjustment. Then, the DSP module 63 calculates pixel values of other color difference components than one color component of each pixel by pixel signal interpolation based on ambient pixel values in accordance with an arrangement of color filters (e.g. RGB primary color filters) such as a mosaic "Bayer arrangement" or a G checkered pattern and R/B line sequential filter arrangement (in which G (green) pixels are arranged zigzag in a cycle period of two pixels horizontally and vertically), provided in a front face of the image capturing device 56 (color interpolation processing). In this manner, the captured image signal is converted into digital image data having gradation values according to RGB color difference components for respective pixels.

If necessary, the resize/interpolation processing circuit may perform resolution conversion for converting the captured image size into a different image size before color correction. For example, resize or interpolation for converting the image size into a predetermined image size (such as a VGA size) is performed so that the live preview image or playback image can be written in the video RAM or display RAM area in the display driver so as to be displayed on the finder or image monitor. Or scaling down/up processing, resize/interpolation processing or resolution conversion for converting the image size into a set recording image size is performed so that image data of a desired recording image size can be recorded at the time of image capturing and recording. It is preferable that contour emphasis filtering such as unsharpness filtering or image sharpness filtering is used in combination with the resize/interpolation processing because the image subjected to the resize/interpolation processing is apt to be blurred or lowered in resolution. Moreover, in the DSP module 63, the RGB digital image signal subjected to gradation correction by the gamma correction circuit is temporarily stored in a buffer memory and then reproduced and displayed on an electronic finder such as an LCD monitor. Or the RGB digital image signal on an RGB color space is converted into an image signal on a predetermined color space such as a YUV/YCbCr color space by a color matrix circuit and compression-coded to JPEG still image data, MPEG4 or H.264 motion image data or the like by an image CODEC.

Although the angle of view for image capturing is unchanged when thinning or compression interpolation is used for reducing the number of pixels, it is necessary to extract an image from a narrow view angle range when a wide finder is used. When a zoom lens is used, there arises a problem that the zoom system is biased toward a telephoto side because the view angle range allowed for image capturing is too narrow to capture a wide-angle image. Therefore, when the zoom system biased toward the telephoto side is combined with a zoom lens system slightly shifted to a wide-angle side by a value of 1/1.25 to 1/2 from the normal value in accordance with the visual field widening ratio on the assumption that the visual field widening ratio ordinarily used in finder display is in a range of from 125% to 200%, the aforementioned problem can be solved.

Figure 12:
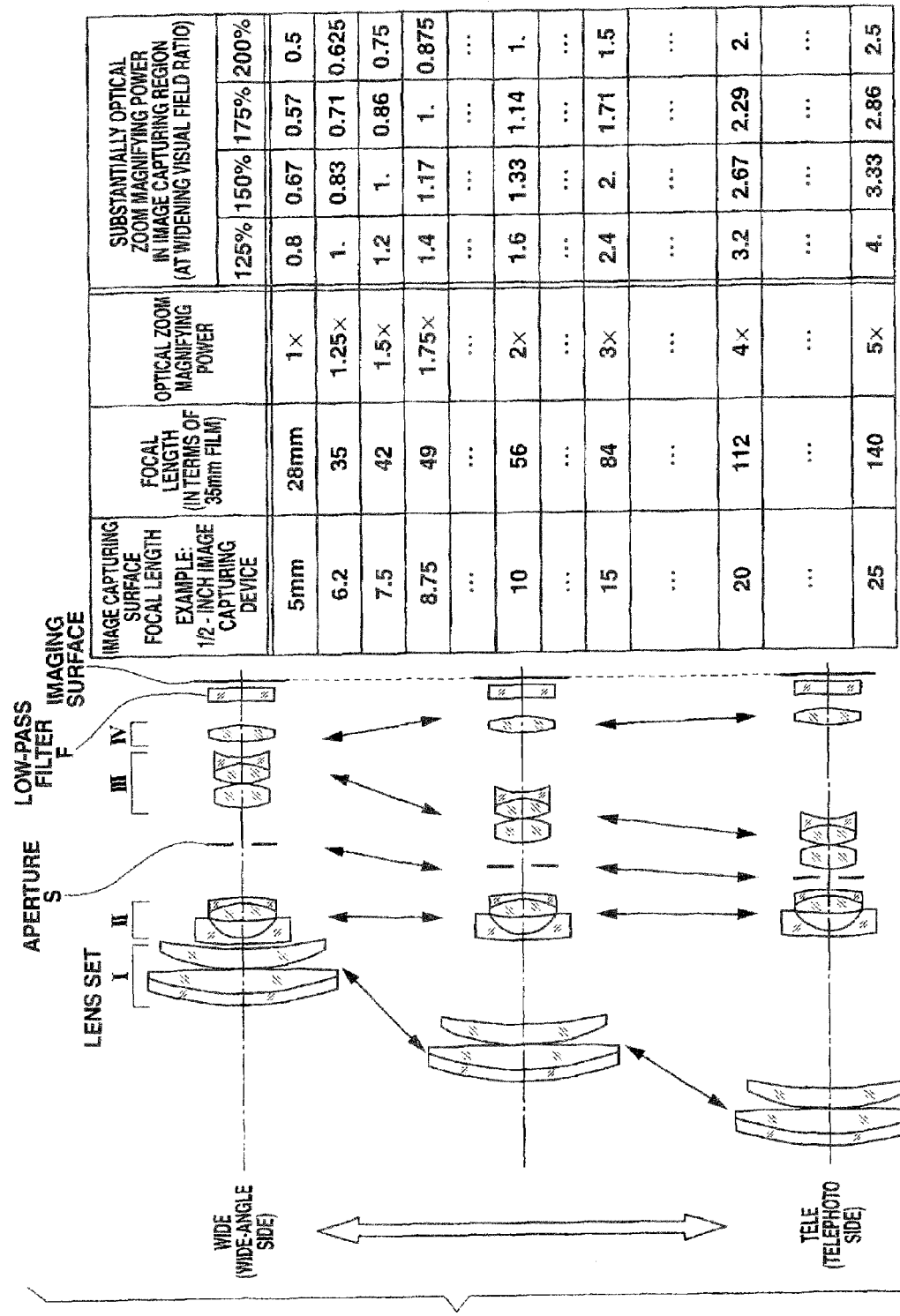
FIG. 12 is a view showing an example of configuration of a zoom lens system and the relationship between the optical zoom magnifying power and the visual field widening ratio.

FIG. 12 shows an example of configuration of a zoom lens system and the relationship between the optical zoom magnifying power and the visual field widening ratio. Assuming that the visual field widening ratio WR used most frequently is about 125% and the normal focal length of a ×5 optical zoom system of a ½-inch image capturing device is in a range of 6.2 mm to 32 mm (about 35 mm to 175 mm in terms of 35 mm film), then it is preferable that the focal length at a wide-angle end is set at a wide-angle focal length not larger than 6.2 mm/(141/100)=4.4 mm, that is, a zoom system having a focal length range of 4.4 mm to 22 mm (about 24.8 mm to 124 mm in terms of 35 mm film) is set.

A display control unit may be provided for calculating the angle of view for image capturing or the focal length in terms of 35 mm film in place of the real focal length and controlling the display panel 79 to display the image.

In addition, a control unit may be provided for controlling the zoom lens to move in an operating range slightly biased toward the telephoto side at the normal time but controlling the zoom lens to move in an operating range biased toward the wide-angle side in accordance with the finder visual field widening ratio at the time of use of the wide finder. A setting unit for setting the zoom focal length or the optical zoom magnifying power dynamically in accordance with the finder visual field widening ratio may be provided so that a capturing range (view angle) substantially equal to that at the normal time can be obtained even when the wide finder is used.

In this manner, an appropriate optical zoom magnifying power can be set in accordance with the finder visual field widening ratio.

Figure 13:
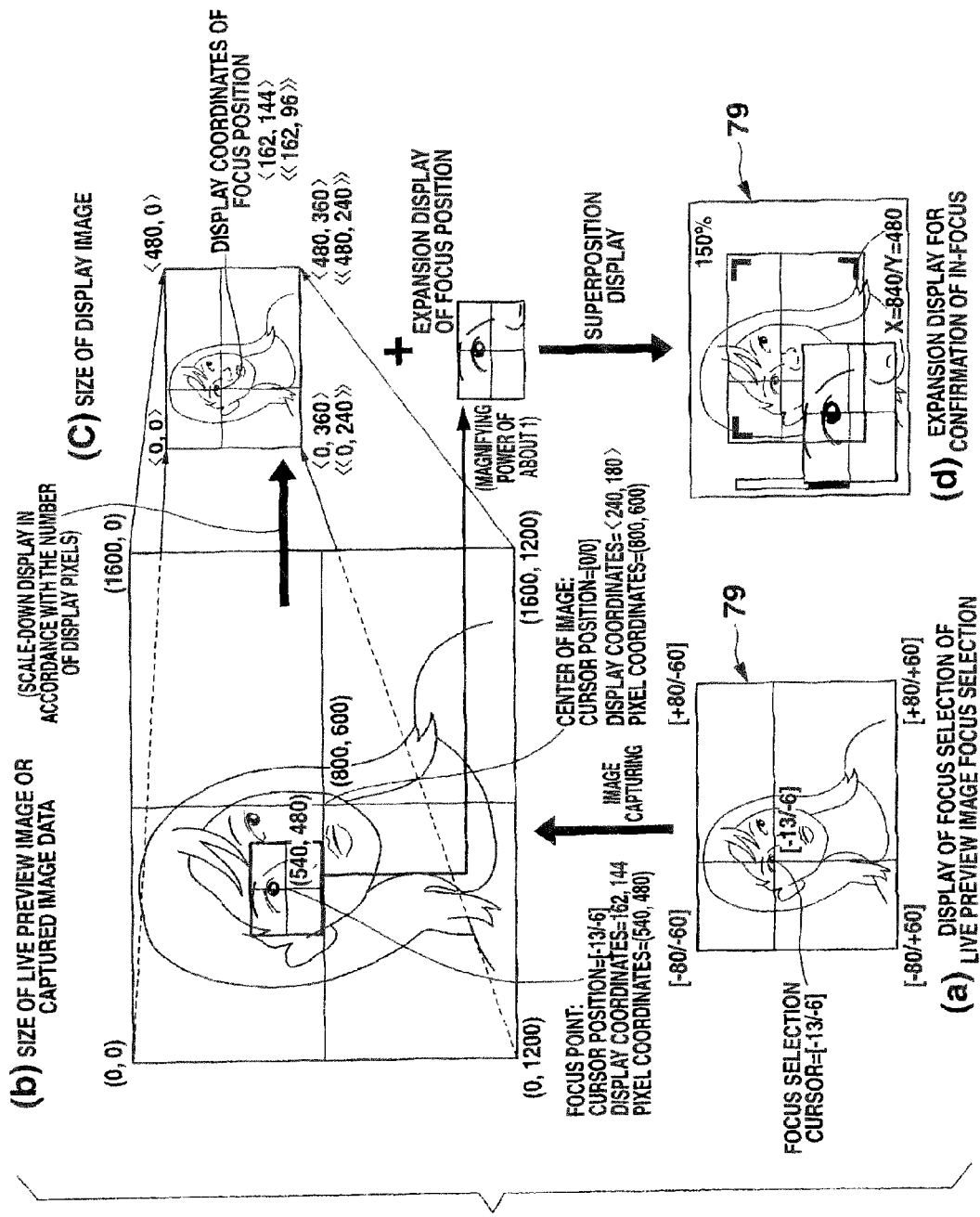
FIG. 13 is a view showing other examples of a display screen.
Figure 14A:
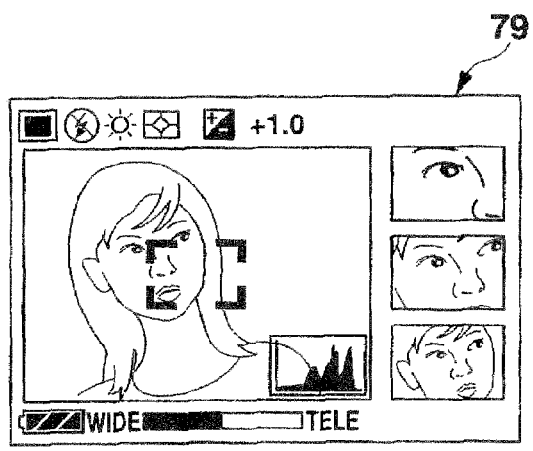
FIGS. 14A and 14B are views showing another example of the display screen.
Figure 14B:
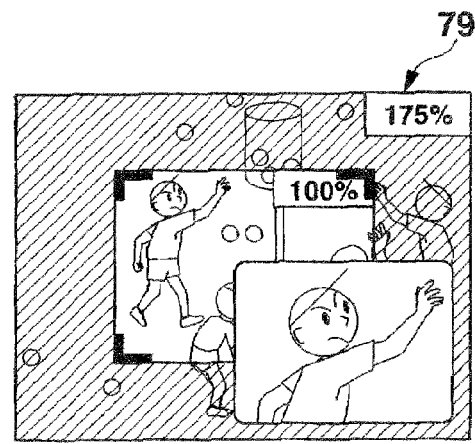

Although the embodiment has been described on the case where the live preview image is displayed in the form of a single screen on the display panel 79, the live preview image may be displayed in a display form shown in FIGS. 13, 14A and 14B. That is, in the display form shown in FIG. 13, focus selection of the live preview image is displayed on the display panel 79 as shown in section (a) of FIG. 13 so that the user can select the focus position. While the size of the display image shown in section (c) of FIG. 13 is extracted from the size of the live preview image or captured image shown in section (b) of FIG. 13, a predetermined range around the focus position is extracted and expanded. Then, as shown in section (d) of FIG. 13, while the display image of the extracted size is displayed as a live preview image, expansion display for confirmation of in-focus is performed based on the focus position which is expanded and displayed so as to be superposed on the live preview image. Accordingly, the user can confirm accurately whether the image is in focus or not, by visually recognizing the expansion display for confirmation of in-focus.

Alternatively, the central portion of the image may be displayed on different screens based on a plurality of magnifying powers without necessity of user's selection of the focus position as shown in FIG. 14A or a subject person may be recognized so that the recognized subject person portion can be displayed so as to be superposed on the live preview image as shown in FIG. 14B.

It is to be understood that the present invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. An image capturing apparatus comprising:
   an imaging unit which captures an image of a subject;
   a memory unit;
   a display unit; and
   a processor which performs image processing on the image captured by the imaging unit to generate a first image having a first image size and a second image having a second image size, wherein the processor controls the memory unit to store the first image while controlling the display unit to display the second image as a live preview image of the image captured by the imaging unit,
   wherein the processor sets a visual field widening ratio, which indicates a ratio between the first image size and the second image size, in accordance with a user operation,
   wherein the processor automatically adjusts the second image size based on the visual field widening ratio and the first image size, and
   wherein the processor sets the visual field widening ratio directly and freely in accordance with the user operation so as to set the second image size to be larger than the first image size.

2. The apparatus according to claim 1, wherein the processor performs the image processing to display the second image as the live preview image on the display unit in a mode in which the first image size is recognizable by a user.

3. The apparatus according to claim 2, wherein the processor performs the image processing to display a first region corresponding to the first image size in a color mode and to display a second region excluding the first region in a monochrome mode.

4. The apparatus according to claim 1, wherein the processor performs the image processing to display a value indicating the visual field widening ratio while displaying the live preview image on the display unit.

5. The apparatus according to claim 1 further comprising:
   a user interface configured to receive commands including a record command input by a user; and
   a recording unit configured to record the first image on a recording medium in response to the record command.

6. The apparatus according to claim 1, further comprising a wide-angle lens configured to form the image of the subject on the imaging unit, wherein the processor produces the first image by performing a digital zoom processing on the image captured by the imaging unit through the wide-angle lens.

7. The apparatus according to claim 1, further comprising:
a zoom lens configured to form the image of the subject on the imaging unit; and
an actuator unit configured to actuate the zoom lens to change an optical zoom ratio,
wherein the processor produces the first image from the image captured by the imaging unit through the zoom lens.

8. The apparatus according to claim 1, wherein the processor performs the image processing to apply a digital zoom on the live preview image by performing a pixel addition processing on the image captured by the imaging unit.

9. A method for controlling an image capturing apparatus, wherein the apparatus comprises: an imaging unit which captures an image of a subject; a memory unit; and a display unit, the method comprising:
performing image processing on the image captured by the imaging unit to generate a first image having a first image size and a second image having a second image size; and
controlling the memory unit to store the first image while controlling the display unit to display the second image as a live preview image of the image captured by the imaging unit,
wherein a visual field widening ratio is set in accordance with a user operation, the visual field widening ratio indicating a ratio between the first image size and the second image size,
wherein the second image size is automatically adjusted based on the visual field widening ratio and the first image size, and
wherein the visual field widening ratio is set directly and freely in accordance with the user operation so as to set the second image size to be larger than the first image size.

10. The image capturing apparatus according to claim 1, further comprising:
a zoom unit which sets a zoom ratio,
wherein the processor automatically adjusts the first image size and the second image size in accordance with the zoom ratio and the visual field widening ratio.

11. The image capturing apparatus according to claim 10, wherein the zoom unit sets a digital zoom ratio for performing digital zoom processing, and
wherein the processor automatically adjusts the first image size and the second image size in accordance with the digital zoom ratio and the visual field widening ratio.

12. The apparatus according to claim 1, wherein the processor generates the second image having the second image size from a third image having a third image size captured by the imaging unit, the second image size being smaller than the third image size, and
wherein the processor controls the display unit to display the second image as the live preview image, and generates the first image having the first image size smaller than the second image size from the image captured by the imaging unit and controls the memory unit to store the first image.

13. The apparatus according to claim 1, wherein the processor sets the visual field widening ratio within a range from 100% to 200% directly and freely in accordance with the user operation.

* * * * *